United States Patent [19]

Mansell et al.

[11] Patent Number: 4,506,298
[45] Date of Patent: Mar. 19, 1985

[54] METHOD AND APPARATUS FOR DISPLAYING OBJECTS ON AN INTERLACED RASTER SCAN TELEVISION SCREEN

[75] Inventors: Barry N. Mansell, Billerica; David Friedman, Bedford, both of Mass.

[73] Assignee: Computervision Corporation, Bedford, Mass.

[21] Appl. No.: 440,301

[22] Filed: Nov. 9, 1982

[51] Int. Cl.³ .............................................. H04N 5/14
[52] U.S. Cl. .................................................. 358/160
[58] Field of Search ....................... 358/160, 138, 280

[56] References Cited

U.S. PATENT DOCUMENTS 4,280,144  7/1981  Bacon .................................. 358/280

Primary Examiner—Richard Murray
Attorney, Agent, or Firm—Richard J. Birch

[57] ABSTRACT

A method and apparatus for improving the display of objects on an interlaced raster-scan television are disclosed. The invention takes each data point that will appear as a pixel on the screen and makes it appear also at pixel locations displaced by one unit in each of two axes, individually or collectively if desired. The direction of displacement is uniform for any given picture. The additional appearance is not stored as part of the picture data, but instead is generated "on the fly" as part of reading the data and preparing it for presentation on the television screen.

11 Claims, 4 Drawing Figures

METHOD AND APPARATUS FOR DISPLAYING OBJECTS ON AN INTERLACED RASTER SCAN TELEVISION SCREEN

BACKGROUND OF THE INVENTION

The present invention relates to interlaced raster-scan television displays in general and, more particularly, to a method and apparatus for improving the display of objects, such as, computer-graphics on an interlaced raster-scan television.

The invention is primarily intended for use with high-resolution television (on the order of 1,000 scan lines), where some of the visual display problems are more pronounced, but is also applicable to other resolutions. In the discussion below, a 1,024-line horizontal-scan display will be used for purposes for explanation and illustration and a knowledge of television operation will be assumed.

One of the major problems with an interlaced display is frame-rate flicker of horizontal (scan line direction) lines. With computer-generated output, a horizontal line is likely to appear on a single scan line. This will then flicker at the frame refresh rate of the television. Especially, if there are a number of horizontal lines in the same field, this flicker is very noticeable and objectionable to an operator, and can cause headaches, eyestrain, etc. One approach to the problem has been the use of long-persistence phosphors. These help, but flicker is still noticeable, and not all the color television phosphors are available with long persistence (e.g. blue). Another approach is to simply decrease display brightness, where the eye is less sensitive to flicker. However, this approach makes the display hard to see in a normally illuminated room. A third approach is to increase the frame refresh rate above the normal 25 to 30 Hz. To be effective, this requires a considerable increase in the various system bandwidths.

One problem is the bandwidth required to display a picture. A reasonable display will have pixels that are, or are nearly, square (e.g. 1,280 by 1,024 in the example). For a small pixel size, high bandwidth is required in the video generation, transmission, reception, and the final CRT itself. To go from an existing to a higher resolution, normally requires an increase in all these bandwidths. Associated with this technique may be higher cost and complexity, reduced transmission distance and dimmer CRT picture (to get a smaller spot size).

One problem with computer-generated displays is the stair-stepping ("jaggies") that occurs with off-axis lines. This is due to the discrete nature of the data, where a line appears at one pixel, or the next, but not halfway between. Jaggies usually do not affect system usefulness, but are noticeable and aesthetically unpleasing. There are a number of "gray scale dejaggy" algorithms that can make such lines appear quite smooth. However, there is a computational overhead (giving a longer time to display an image) and the lines get fatter and slightly blurred (giving less resolution).

It is, accordingly, a general object of the invention to provide a method and apparatus for improving the appearance of objects displayed on an interlaced raster-scan television.

It is a specific object of the invention to reduce frame-rate flicker of scan lines in an interlaced raster scan display.

It is still another object of the invention to reduce the apparent stair-stepping that occurs with off-axis lines in an interlaced raster-scan display.

It is a feature of the invention that positionability of graphics elements is maintained while improving the display of such elements on an interlaced raster-scan display.

BRIEF DESCRIPTION OF THE INVENTION

The present invention addresses each of the above problems and provides other benefits as well. The concept is to take each data point that will appear as a pixel on the screen, and make it appear, also at pixel locations displaced by one unit in each of the two axes, individually (and collectively, if desired). The direction of displacement is uniform for any given picture. For purposes of explanation, "right" and "down" are used, although left and/or up will work as well. This additional appearance is not stored as part of the picture data, but is instead generated "on the fly" as part of reading the data and preparing it for presentation. The handling of overlaps of stored and non-stored pixels may be different for different implementations; one method is to "OR" the data from each, another is to give priority to the stored pixel data.

Frame-rate flicker of interlaced displays is overcome, since the pixel "below" any data point pixel is in the other field. Thus any lines that would have flickered at the frame rate, now are refreshed at the (higher) field rate which is normally above the eye's flicker threshold.

It is very important to note that, since the displacement direction is uniform, the positionability of graphics elements is not reduced. An element can be origined at any basic pixel location (e.g. on any of 1,024 lines), and its location is always different than if it had been origined one pixel away.

Bandwidth requirements are reduced, since each pixel now appears twice as wide. For the example of a 1,280×1,024 display, the bandwidth is about the same as required for a 640×512 (non-interlaced) display. This allows reasonable hardware, and is within the capabilities of common CRT's.

It should be noted that, as for gray scale dejaggy, individual lines increase in width. The width gain is about the same for lines in all directions, so visual uniformity is retained. If the increased width or "fatness" is judged to present a problem, then in implementation the invention's function can be turned on or off under operator control. In this way, the operator can get a high resolution look at specific areas, then return to the better presentation. This approach does not require regeneration of the picture (or wasted storage space), because the additional pixels are not stored. A different way to get a high resolution look is to implement a hardware zoom. At 2× zoom, each data panel appears on two scan lines, and two display pixels wide, removing flicker and bandwidth problems. At this 2× zoom, since the additional pixels are not stored, the full precision of the 1,280×1,024 picture data is visible (although not all at the same time).

The appearance of jaggies is reduced somewhat, although not removed entirely, by the present invention. Jaggies are most apparent when their step size is equal to the line width. When the present invention is used, the step size is equal to about half the line width. Thus, the effect is less obvious.

The above-mentioned objects and features of the invention will best be understood from a detailed description of a preferred embodiment of the invention, selected for purposes of illustration and shown in the accompanying drawings in which.

DETAILED DESCRIPTION OF THE INVENTION

Figure 1A:
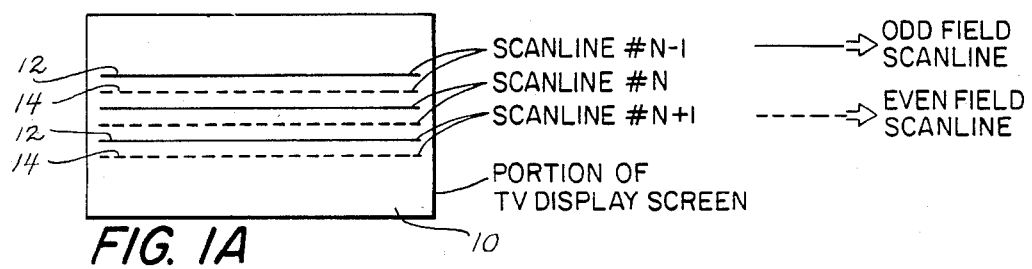
FIG. 1A illustrates the "deflicker" portion of the invention.
Figure 1B:
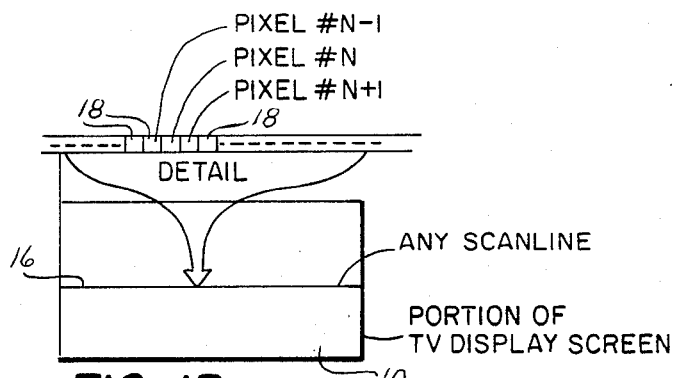
FIG. 1B illustrates the "stretch" portion of the invention.
Figure 1C:
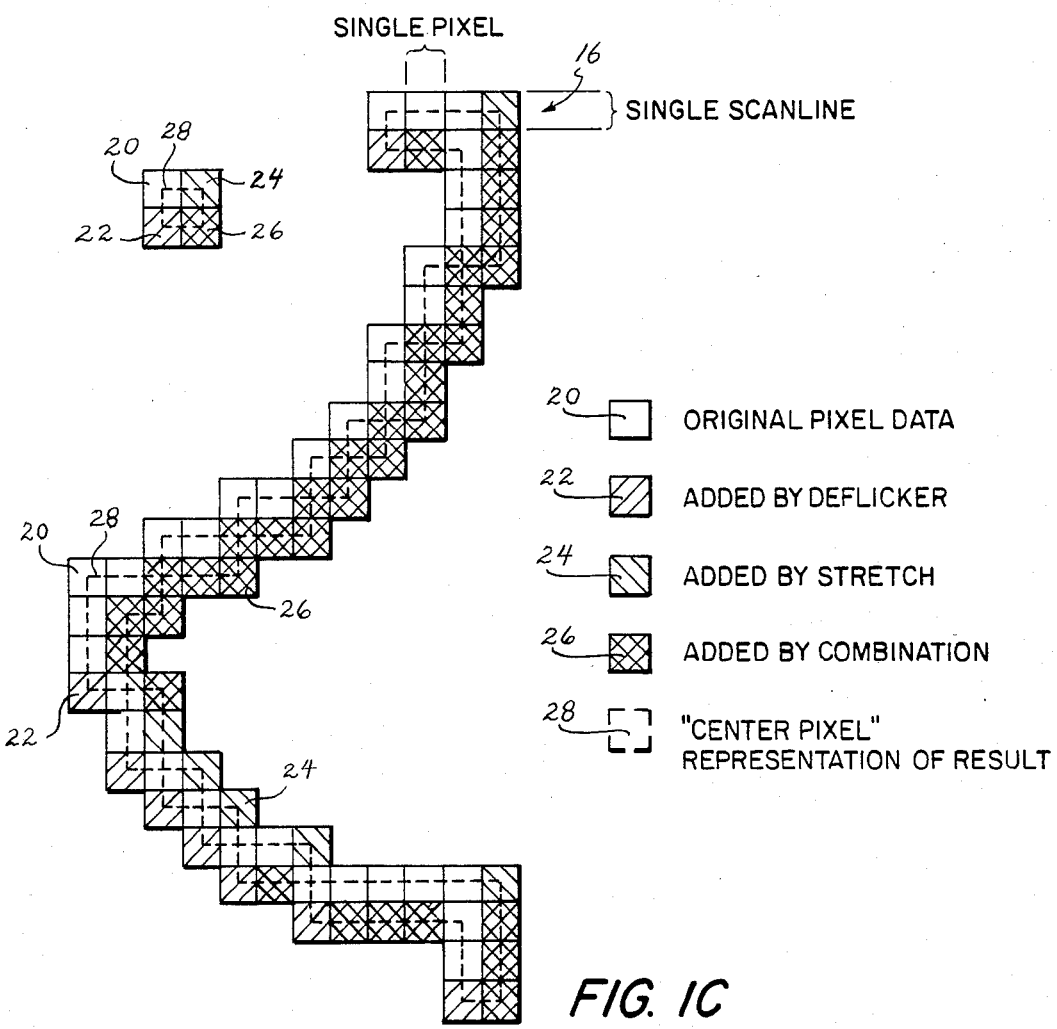
FIG. 1C illustrates the combined actions of the "deflicker" and "stretch" portions of the invention; and, FIG. 2 is a block diagram of a circuit implementation of the method of the invention.

Turning now to the drawings, and specifically to FIGS. 1A through 1C thereof, there is illustrated in consecutively greater detail the underlying concept of the present invention. FIG. 1A illustrates a portion of a TV display screen 10 having a plurality of odd and even field scan lines 12 and 14, respectively. Data for odd scan line #N are displayed on that scan line where they are ORed with data for the even scan line #N−1, and also on even scan line #N, where they are ORed with that data. The data for even scan line #N are displayed on that scan line where they are ORed with data for the odd scan line #N, and also on odd scan line #N+1 where they are ORed with that data. The operation just described constitutes the "deflicker" portion of the invention.

The "stretch" portion of the invention is illustrated in FIG. 1B. FIG. 1B shows in detail a scan line 16 having a plurality of pixels 18. The data for pixel #N are displayed there where they are ORed with data for pixel #N−1 and also at pixel #N+1 where they are ORed with data for that pixel.

FIG. 1C illustrates how data are combined for both the "deflicker" and "stretch" operations of FIGS. 1A and 1B, respectively. This figure shows the effect of the operation of the invention on dot and a multi-directional line. The original pixel data is identified by the reference numeral 20 while the data added by the "deflicker" and "stretch" operations are indicated by the reference numerals 22 and 24, respectively. If desired, the "stretch" and "deflicker" operations can be combined to produce data represented by the reference numeral 26. The "center pixel" representation of the result is indicated in FIG. 1C by the reference numeral 28.

FIG. 1C illustrates the effect of the invention when applied for different directions of line. The multi-directional line used includes segments at eight major slopes of zero, plus or minus one-half, plus or minus one, plus two and infinity. The "center pixel" representation 28 depicts the effect of the position shift caused by the invention. It should be noted that positional relationships are unaffected because all data centers are shifted the same amount in the same direction.

Figure 2:
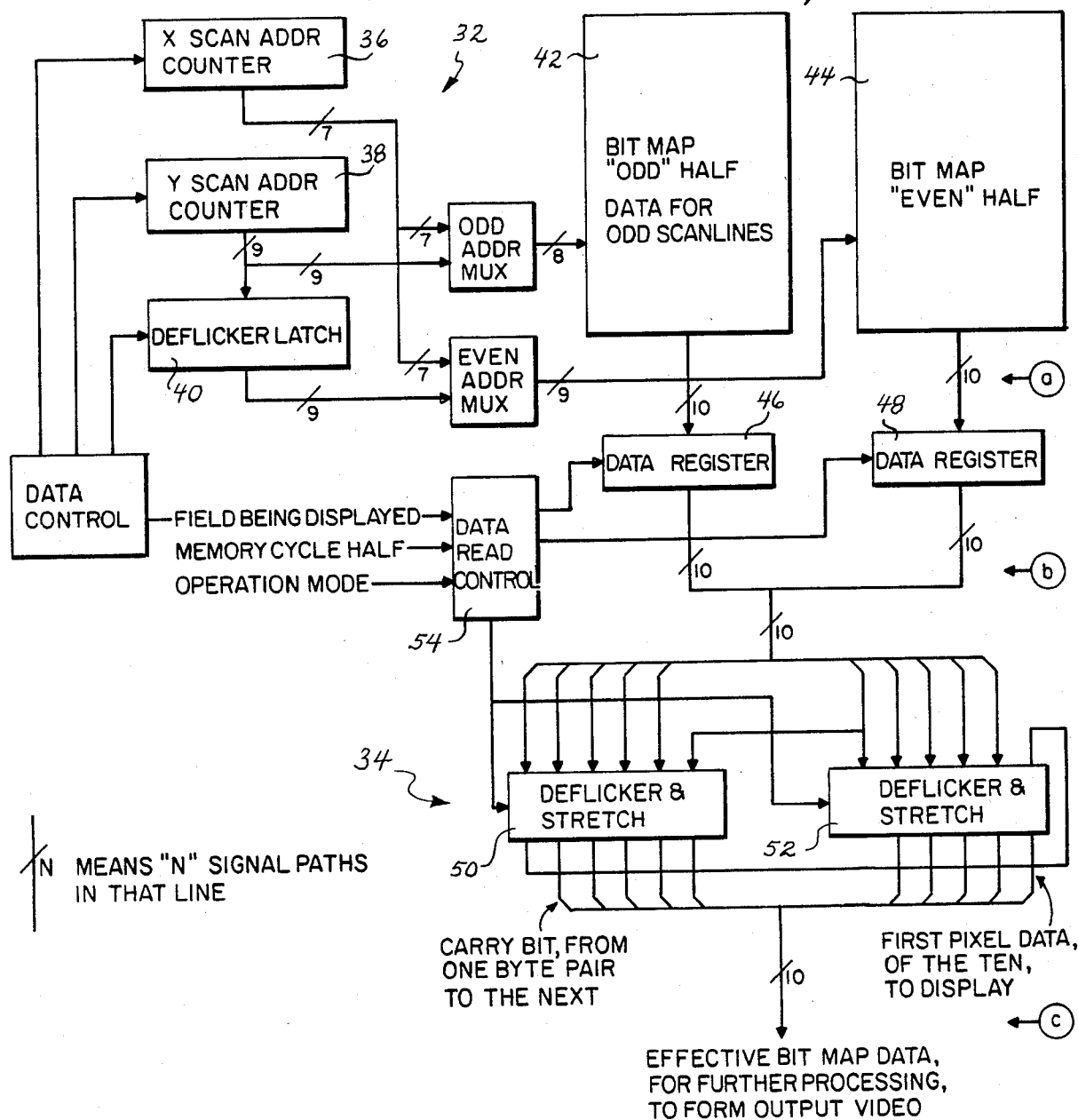

Referring now to FIG. 2, there is shown a block diagram of the major components of one implementation of the invention. It should be understood that the diagram is not that of a full system and that the blocks shown in FIG. 2 have other functions and elements. However, these other functions and elements are not relevant to the invention. Examples include a read mask, bit map reconfigurations, memory refresh, normal timing and control, zoom and roam, etc. Furthermore, the various initializations are not depicted in FIG. 2.

The area shown in FIG. 2 includes one bit map plane indicated generally by the reference numeral 30, its addressing structure indicated generally by the reference numeral 32 and its output and deflicker circuitry indicated generally by the reference numeral 34. It should be understood that there may, of course, be many planes, each with its own output circuitry. The X and Y scan address counters 36 and 38, respectively, contain the address of the next byte to be displayed on the television screen 10. The Y-counter 38 is incremented for each new scan line while the X-counter 36 is incremented for each new 10-bit byte.

A deflicker latch 40 is loaded with the contents of the Y-counter 38, either just before or just after it is incremented, depending upon which field is being displayed at the time. The two fields are arranged such that a given numbered scan line in the odd field lies just above the same numbered scan line in the even field. If the even field is being displayed, the deflicker latch 40 is loaded just after the Y-counter is incremented. If the odd field is being displayed, the deflicker latch 40 is loaded just before the Y-counter is incremented. Thus, the data read from the bit map contain the byte for the scan line being displayed, and also the byte for the scan line located just above it (from the opposite field). These bytes are subsequently ORed to obtain a composite 10-bit byte for display purposes. The bit map plane 30 is divided in half on a field basis into an odd half 42 and an even half 44. Each half has its own addressing as described above and its own output data register identified as 46 (odd) and 48 (even). At circuit level (a), a single bit map read cycle provides two 10-bit bytes, one from each map half, as described above. The cycle time (done using memory page mode) is 180 ns. At circuit level (b), consecutive accesses every 90 ns produce bytes from the alternate fields that are operated upon the deflicker and stretch circuitry 50 and 52, respectively, under control of a data read control block 54.

The data read control block 54 is constructed from fuse-programmable logic. It controls the operation of the deflicker and stretch circuits 50 and 52 and determines which 10-bit byte is accessed from the data registers 46 and 48. The "operation mode" can specify normal display mode (where the invention does not operate) as well as deflicker and stretch mode. Certain other functions are also performed here such as data blanking and unmasking. It will be appreciated that knowledge of the field being displayed and the memory cycle halves (90 ns each) are required for operation.

The deflicker and stretch circuits 50 and 52 also are made from fuse-programmable logic. These two circuits perform the bit ORing that implements the invention. The previously mentioned circuit components provide the proper data at the proper time for this to happen. The deflicker and stretch circuits 50 and 52 are identical and contain data storage for output and to combine with following inputs. As the first byte of a pair is presented, it is simply loaded into internal storage, retaining a carry bit from the previous byte pair. As the second byte of the pair is presented, a 4-input OR function is performed for each output pixel, using the pixel's stored and input data, and the previous pixel's stored and input data. The result is then stored and used as output data. A new carry bit is also stored for use with the next byte pair. The output data at circuit level (c) are available every 180 ns, and further processed to form the output video.

Having described in detail a preferred embodiment of our invention, it will now be apparent to those skilled in the art that numerous modifications can be made therein without departing from the scope of the invention as defined in the following claims.

What we claim and desire to secure by Letters Patent of the United States is:

1. A method for displaying objects on an interlaced, raster scan television screen where there is initially at least one data point for each pixel, said method comprising the steps of:
   (1) displaying a data point as a pixel on the screen; and,
   (2) displaying the same data point at pixel locations displaced by at least one unit in each of two axes, the direction of displacement in each axis being the same for all data points.

2. The method of claim 1 wherein said same data point is displayed individually at said pixel locations.

3. The method of claim 1 wherein said same data point is displayed collectively at said pixel locations.

4. The method of claim 3 wherein said pixel locations overlap.

5. The method of claim 1 wherein said same data input is displayed at pixel locations displaced by at least one unit in each of two orthogonal axes.

6. A method for displaying objects on an interlaced, raster scan television screen where there is initially at least one data point for each pixel, said method comprising the steps of:
   (1) displaying a data point as a pixel on the screen; and,
   (2) displaying the same data point at a pixel location displaced by at least one unit in an axis that is orthogonal to the scan axis of the television screen with the direction of displacement along said axis being the same for all data points.

7. A method for displaying objects on an interlaced, raster scan television screen where there is initially at least one data point for each pixel, said method comprising the steps of:
   (1) storing picture data;
   (2) displaying a data point of said stored picture data as a pixel on the screen;
   (3) generating from the stored picture data signals to cause said data point to be displayed at pixel locations displaced by at least one unit in each of two axes, the direction of displacement in each axis being the same for all data points; and,
   (4) displaying in response to said signals said data point at pixel locations displaced by at least one unit in each of two axes, the direction of displacement in each axis being the same for all data points.

8. An apparatus for displaying objects on an interlaced, raster scan television screen where there is initially at least one data point for each pixel comprising:
   (1) means for displaying a data point as a pixel on the screen; and,
   (2) means for displaying the same data point at pixel locations displaced by at least one unit in each of two axes, the direction of displacement in each axis being the same for all data points.

9. An apparatus for displaying objects on an interlaced, raster scan television screen where there is initially at least one data point for each pixel comprising:
   (1) means for displaying a data point as a pixel on the screen; and,
   (2) means for displaying the same data point at a pixel location displaced by at least one unit in an axis that is orthogonal to the scan axis of the television screen with the direction of displacement along said axis being the same for all data points.

10. An apparatus for displaying objects on an interlaced, raster scan television screen where there is initially at least one data point for each pixel comprising:
    (1) means for storing picture data;
    (2) means for displaying a data point of said stored picture data as a pixel on the screen;
    (3) means for generating from the stored picture data signals to cause said data point to be displayed at pixel locations displaced by at least one unit in each of two axes, the direction of displacement in each axis being the same for all data points; and,
    (4) means for displaying in response to said signals said data point at pixel locations displaced by at least one unit in each of two axes, the direction of displacement in each axis being the same for all data points.

11. An apparatus for displaying objects on an interlaced, raster scan television screen where there is initially at least one data point for each pixel comprising:
    (1) means for storing picture data;
    (2) means for displaying a data point of said stored picture data as a pixel on the screen;
    (3) means for generating from the stored picture data signals to cause said data point to be displayed at pixel locations displaced by at least one unit in an axis that is orthogonal to the scan axis of the television screen with the direction of displacement along said axis being the same for all data points; and,
    (4) means for displaying in response to said signals said data point at pixel locations displaced by at least one unit in an axis that is orthogonal to the scan axis of the television screen with the direction of displacement in each axis being the same for all data points.

* * * * *

UNITED STATES PATENT AND TRADEMARK OFFICE
CERTIFICATE OF CORRECTION

PATENT NO. : 4,506,298
DATED : March 19, 1985
INVENTOR(S) : Barry N. Mansell, et al It is certified that error appears in the above–identified patent and that said Letters Patent are hereby corrected as shown below:

Column 5, line 26, "input" should be -- point --.

Signed and Sealed this

Sixth Day of August 1985

[SEAL]

Attest:

DONALD J. QUIGG

Attesting Officer     Acting Commissioner of Patents and Trademarks